United States Patent [19]
Lewis

[11] 3,790,098
[45] Feb. 5, 1974

[54] SEAT BELT RETRACTOR APPARATUS
[76] Inventor: Gerald F. Lewis, 1850 Columbia, Berkley, Mich. 48072
[22] Filed: Mar. 8, 1972
[21] Appl. No.: 232,823

[52] U.S. Cl. .......................................... 242/107.4
[51] Int. Cl. ..................... A62b 35/00, B65h 63/04
[58] Field of Search ................ 242/107.4, 107.5 B; 280/150.5 B; 297/388; 292/22, 65, 144, 184, 201, 248

[56] References Cited
UNITED STATES PATENTS
| | | | |
|---|---|---|---|
| 3,521,832 | 7/1970 | Rex | 242/107.4 |
| 3,508,720 | 4/1970 | Kell | 242/107.4 |
| 2,927,811 | 3/1960 | Rea et al. | 292/184 |

Primary Examiner—Stanley N. Gilreath
Assistant Examiner—Jon W. Henry
Attorney, Agent, or Firm—Hugh L. Fisher

[57] ABSTRACT

Seat belt retractor apparatus incorporating a latch bar for locking the belt in a selected retracted position. The latch bar is maintained in an unlatched position by a holding mechanism which is responsive to inertia forces. The holding mechanism has a locking device which combines with a magnet device in a set position thereof to hold the latch in the unlatched position until inertia forces acting on the magnet device exceed a certain magnitude whereupon the magnet device is forced to an unset position and the latch bar is released by the locking device. The locking device and the magnet device are returned to their respective latch holding positions by a reset device which is actuated by the belt as it is rewound by the retractor.

14 Claims, 7 Drawing Figures

SEAT BELT RETRACTOR APPARATUS

This invention relates to improvements in seat belt retractor apparatus and also to inertia operated devices adapted, although not exclusively, for use with seat belt retractor apparatus.

With a latching type seat belt retractor, often the retractor is latched prematurely so that the buckle cannot be closed. Also the belt when latched can be too tight and render the seat occupant uncomfortable and overly restricted in movement.

With the foregoing in mind, a new and different seat belt retractor is contemplated that utilizes magnetic force to preclude latching until the magnetic force is exceeded by inertia forces acting on the retractor.

Also contemplated is a latching type seat belt retractor that employs a unique magnetically operated holding device which precludes latching until a certain inertia force is exceeded.

Further contemplated is such as magnetically operated holding mechanism that is responsive to inertia forces imposed thereon in all directions.

Another objective is a latching type seat belt retractor that incorporates a magnetically and inertia operated holding mechanism which is set by the belt when wound by the retractor to preclude latching by the subsequently unwound belt until a certain inertia force is exerted thereon.

Also an objective is a new and different holding mechanism that utilizes both inertia and magnetic forces; that is simple structurally and relatively inexpensive to make; and that can be easily installed on conventional latching type retractors or other type devices that are to respond to inertia forces.

The foregoing and other objectives of the invention will become apparent from the following description and the accompanying drawings in which.

Figure 1:
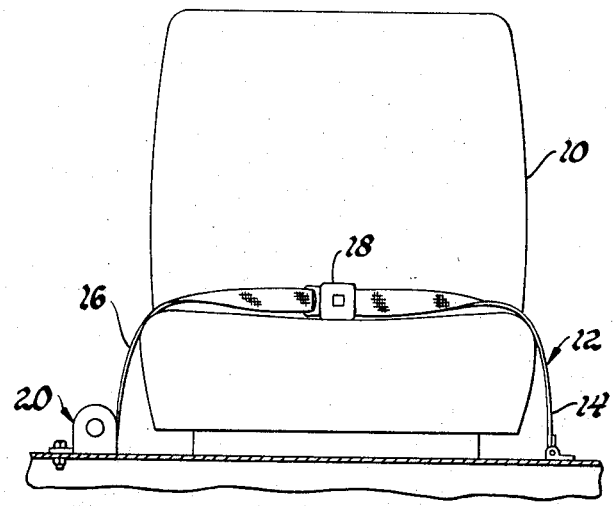
FIG. 1 is a schematic diagram of a seat incorporating seat belt retractor apparatus incorporating the principles of the invention.

Referring first to FIG. 1, the numeral 10 denotes a conventional vehicle passenger seat and the numeral 12 a seat belt. The seat belt 12 comprises the usual inboard and outboard belt sections 14 and 16. These belt sections 14 and 16 at one end are anchored to the vehicle frame or body and at their other ends are joined together by a conventional buckle 18. The outboard belt section 16 is retracted into a wound condition by a latch type retractor 20. The latch retractor 20 incorporates, as shown in FIG. 2, an inertia and magnetically operated holding mechanism 22 which in a way to be explained prevents latching of the retractor 20 except under predetermined conditions.

Figure 2:
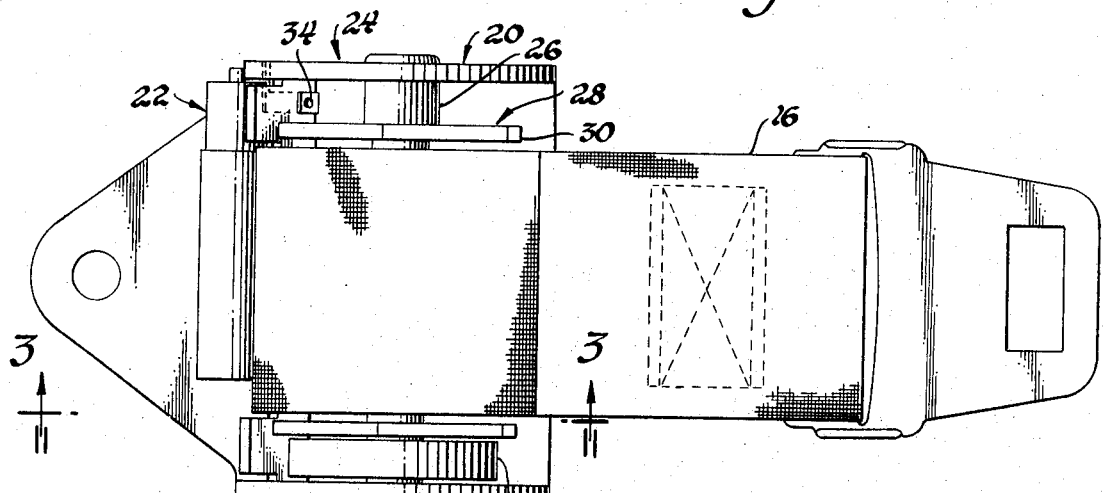
FIG. 2 is an elevational view of the FIG. 1 seat belt retractor.

Referring now to FIG. 2, the retractor 20 can be of any conventional type. The retractor 20 illustrated for exemplary purposes comprises a frame 24 which is bolted to a part of the vehicle. Rotatably mounted on this frame 24 is a reel 26 on which the outboard belt section 16 is wound. The reel 26 includes a ratchet wheel 28 which is rotatable therewith and positioned proximate the edge of the belt section 16. The ratchet reel 28 comprises a plurality of teeth 30 that, as shown for example in FIG. 4, engage a latch bar 32 which prevents further unwinding of the belt section 16 from the reel 26 but allows winding. The latch bar 32 is rotatably joined at its ends to the frame 24 and is biased to the FIG. 4 latched position by a hairpin type spring 34. A clock type spring 36 is wound on the reel 26 and urges the reel 26 to the belt retracted position so that the outboard belt section 16 is wound thereon and made conveniently accessible when the seat belt 12 is to be used. When the seat belt 12 is to be used, the outboard belt section 16 is pulled outwardly to the selected position. In this position the latch bar 32 conventionally assumes a latched position in which it engages the teeth 30 on the ratchet wheel 28 to provide a positive lock against further unwinding of the outboard belt section 16. The shape of the teeth 30 on the ratchet wheel 28 force the latch bar 32 out of engagement when it is desired to have the outboard seat belt section rewound on the reel 26.

As can be appreciated, frequently the outboard belt section 16 will be latched prematurely so that the belt user has to permit the belt section 16 to be rewound partially and then the user starts over. Also sometimes the belt sections 14 and 16 can be joined by the buckle 18 at a time when the belt 12 is too tight and, of course, the latch bar 32 prevents further unwinding of the outboard belt section 16 so that the seat belt user is uncomfortable and overly restricted against movement. For this reason, the holding mechanism 22 is employed to prevent premature latching but still provide latching when it is required in the event that there is a crash or some other condition occurs which requires the restraint of the seat belt 12. This holding mechanism 22 is mounted on the latch bar 32 and conprises a locking device 38, a magnet device 40 and a reset device 42 which cooperate to prevent the latching bar 32 from moving to the latching position depicted in FIG. 4 until needed.

Figure 5:
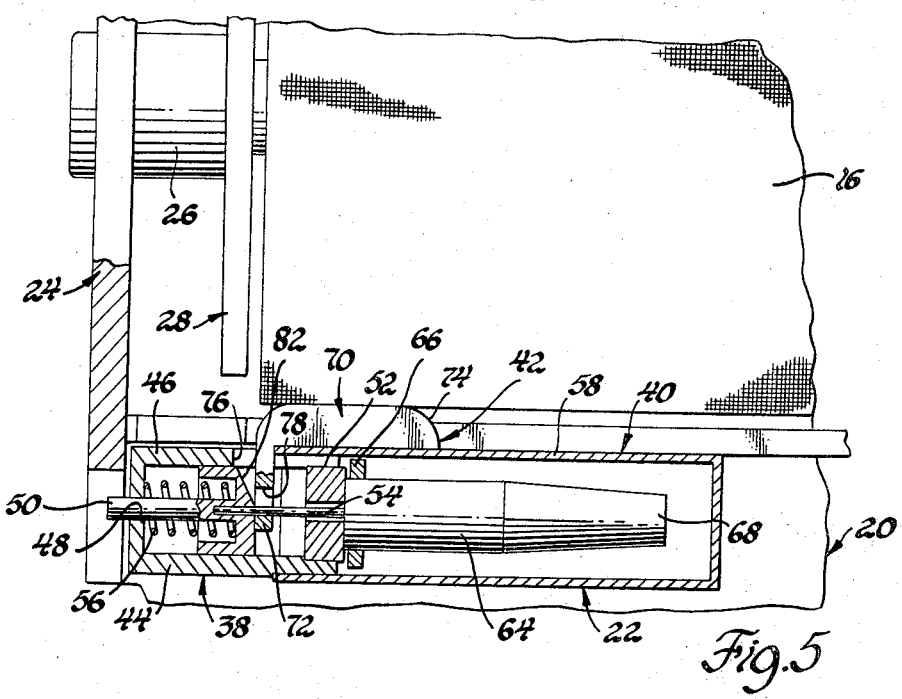
FIG. 5 is a sectional view of a holding mechanism for the FIG. 2 retractor taken in the direction of arrows 5—5 in FIG. 3 and shown in the locked position.
Figure 6:
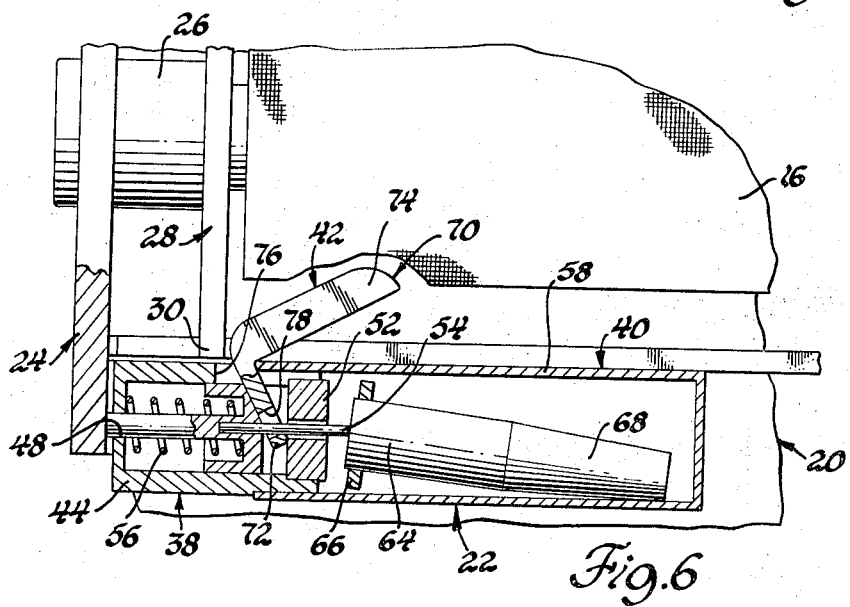
FIG. 6 is a sectional view of the holding mechanism shown in the unlocked position and taken in the direction of arrows 6—6 in FIG. 4.
Figure 7:
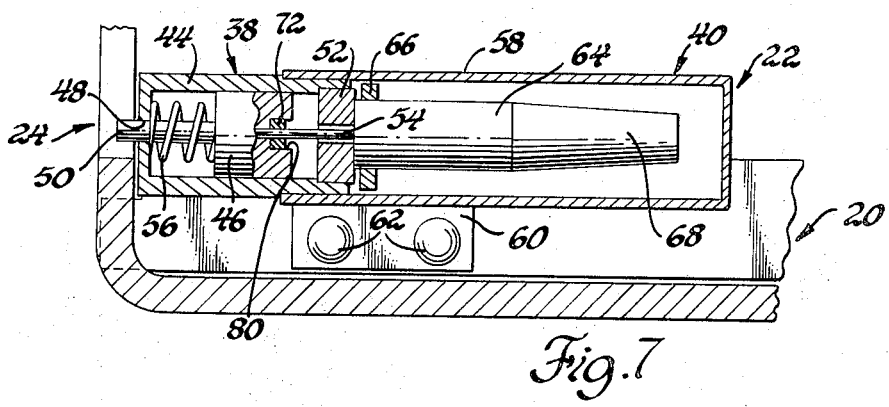
FIG. 7 is another sectional view of the holding mechanism taken in the direction of arrows 7—7 in FIG. 3.

Considering first the locking device 38 and with reference to FIGS. 5, 6 and 7, the locking device 38 has a cylindrical housing 44 in which is slidably positioned a plunger 46. The cylindrical housing 44 and the plunger 46 are formed of a thermoplastic material, such as Delrin. The cylindrical housing 44 has an opening 48 at one end through which a locking rod portion 50 of the plunger 46 extends. At the opposite end, the housing 44 has a metallic ring 52 formed of a magnetic material, such as steel. The plunger 46 on the side opposite the locking rod portion 50 has a small reset pin 54 which extends through the center of the ring 52. This reset pin 54 is also formed of a magnetic material and can be formed of the same material as the ring 52. The plunger 46 is urged toward the steel ring 52 by a coil spring 56. The positioning of the locking device 38 is such that when the plunger 46 is in the FIG. 5 and FIG. 7 positions the locking rod portion 50 will engage or be extended so as to engage the side of the retractor frame 24 to prevent latching by holding the latch bar 32 in the unlatched position, viewed in FIGS. 3 and 5. If preferred, the locking rod portion 50 can engage a groove or hole in the frame 24.

Figure 3:
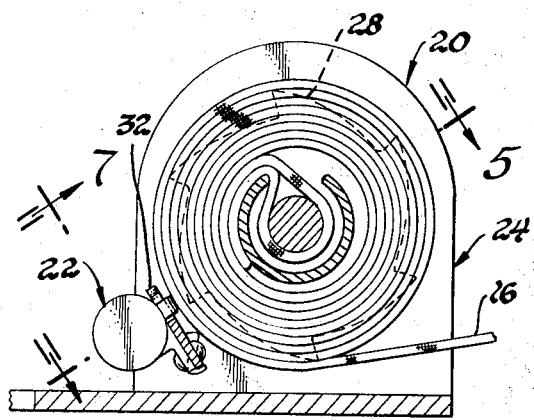
FIG. 3 is a sectional view taken in the direction of arrows 3—3 in FIG. 2 showing the belt retracted.
Figure 4:
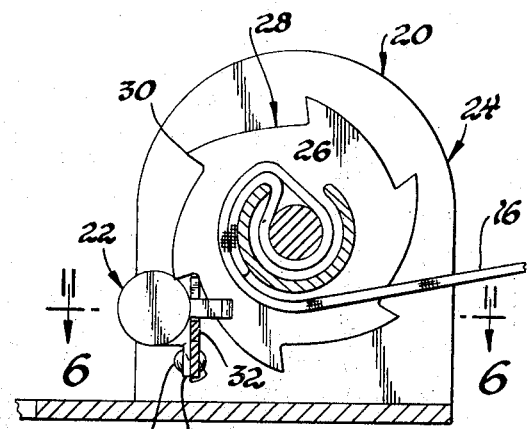
FIG. 4 is a sectional view taken in the direction of arrows 3—3 in FIG. 2 showing the belt extended.

The magnet device 40 holds the locking device 38 in the locking position displayed in FIGS. 5 and 7 and includes a cylindrical housing 58 into which the end of the cylindrical housing 44 is snugly fitted. The cylindrical housing 58 is also formed of a thermoplastic material, such as the mentioned Delrin, and includes a mounting tab 60 which mounts the holding mechanism 22 on the side of the latch bar 32 as shown in FIGS. 3 and 4 by rivets 62 or the ike. Within the cylindrical housing 58 is a permanent magnet 64 made of any of the usual permanent magnet materials, such as Alnico. The magnet 64 has at the end adjacent to the ring 52 for the locking device 38 a centering ring 66 having an outer diameter which closely proximates the inner diameter of the cylindrical housing 58. This centering ring 66 is formed of thermoplastic material which can be the mentioned Delrin. The opposite end of the permanent magnet 64 is provided with a taper at 68.

In the FIG. 5 position, the end of the permanent magnet 64, because of the magnetic attraction, is held against the side of the ring 52 and thus, through the intermediary of the reset pin 54 will force the locking device plunger 46 to the FIG. 5 locked position against the bias from the coil spring 56. Hence, the magnetic attraction force is greater than the bias force. When the retractor 20 and accordingly the permanent magnet 64 is subjected to inertia forces in any direction, the permanent magnet 64 will, in effect, be jarred from the FIG. 5 position to the position pictured in FIG. 6. In this FIG. 6 position it will be noted that the centering ring 66 prevents its end from dropping down into the housing 58, whereas the taper 68 permits the movement of the permanent magnet 64 out of the set position of FIG. 5 to the unset position of FIG. 6. Hence the locking device coil spring 56 will move the plunger 46 and accordingly the locking rod portion 50 to the unlocked position with the locking portion 50 out of engagement with the retractor frame 24.

To move the permanent magnet 64 back to the set position of FIG. 5, the reset device 42 is employed. The reset device 42 comprises a reset lever 70 having an L-shaped configuration and is formed of a thermoplastic material, such as Delrin. The reset lever 70 has a reset pin engaging portion 72 and a belt engaging portion 74. The reset pin engaging portion 72 extends through an opening 76 formed in the locking device housing 44 and has an end opening 78 through which extends the locking device reset pin 54. The locking device plunger 46 is provided with an end slot 80 (see FIG. 7) to receive the reset pin engaging portion 72 of the reset lever 70. This slot 80 is also provided with a tapered portion 82 that accomodates the rocking motion of reset lever 70. The slot 80 prevents relative rotational movement between locking device plunger 46 and the reset lever 70 so that the tapered portion 82 is always aligned with the reset pin engaging portion 72 and the reset lever 70 can be rocked into the tapered portion 82.

Assuming that the reset device 42 is in the FIG. 6 position corresponding to the unlatched position for the latch bar 32, then when the belt section 16 is wound on the reel 26, the belt section 16 will engage and force the reset lever 70 to pivot to the FIG. 5 position. When moving to this position, the magnetic attraction between the end of the reset pin 54 and the permanent magnet 64 will result in the permanent magnet 64 being moved to this FIG. 5 position where the magnetic attraction between the permanent magnet 64 and the locking device ring 52 will overcome the bias from the locking device coil spring 56 and place the locking device 38 in its locked position with the locking rod portion 50 again in engagement with the frame 24.

Summarizing the operation, it will be assumed that the belt section 16 is fully wound on the reel 26 so that the retractor 20 is in its fully retracted position shown in FIGS. 2, 3 and 5. The retracted belt section 16 will have actuated the reset device 42 during the retraction so that the reset lever 70 is moved to the FIG. 5 position and the magnet device 40 is set with the permanent magnet 64 against the locking device ring 52. Because the magnetic force is greater than the bias from the locking device coil spring 56, the locking device 38 will also be set in its locked position with its locking rod portion 50 extending over the edge of the retractor frame 24.

In this locked position, the latch bar 32 is held in its FIG. 3 unlatched position and offers no restraint against unwinding of the belt section 16. Hence, the belt section 16 can be now wound from the reel 26 to its selected position and there will be no premature latching nor discomfort from the seat belt being too tight since there is no latching at this time and thus the belt section 16 is free to be rotated inwardly or outwardly.

If now the vehicle and accordingly the user of the seat belt 12 is subjected to any extreme force, such as an impact force from a collision and the restraint of the seat belt 12 becomes essential, the inertia forces from the impact, regardless of direction, will act upon the magnetic device 40 and in effect jar the permanent magnet 64 from its FIG. 5 set position to its FIG. 6 unset position and out of engagement with the locking device ring 52. With the magnetic force removed, the locking device 38 through its coil spring 56 will urge the plunger 46 to the unlocked position with the locking rod portion 50 moved out of engagement with the frame 24. The latch bar 32 will be biased by its spring 34 to the FIG. 4 latching position and prevent further unwinding movement of the reel 26. The reset device 42 will also through its reset lever 70 be moved by the plunger 46 to the FIG. 6 position since there will be no restraint precluding such movement from the unwound belt section 16.

Subsequently, when the belt section 16 is rewound on the reel 26 of the retractor 20, the reset device 42 will be actuated to force the locking device plunger 46 back to the locking position and in so doing upright or move the magnet device's permanent magnet 64 to the FIG. 5 set position and the latch bar 32 will be held again out of its latching position.

One should be mindful that the opposing forces from the locking device 38 and the magnet device 40 can be varied considerably. Usually, the magnetic force provided by the magnet device 40 is only slightly greater than the bias force from the locking device spring 56. Therefore, the holding mechanism 22 will be more sensitive to any inertia forces corresponding to an impact that requires seat belt restraint and hence, will react more quickly. This is because the difference between the bias force and the magnetic force will be approximately equal to the inertia force that causes the holding mechanism 22 to release the latch bar 32 so as to permit it to move to the FIG. 4 latched position. Also by the unique construction of the holding mechanism 22 and specifically of the permanent magnet 64, the holding mechanism 22 will react to inertia forces in all directions and not in just one direction as do pendulum type inertia devices.

From the foregoing, it will be appreciated that the holding mechanism 22 overcomes the problems of premature latching or latching with the seat belt 12 too tight and with a simple inexpensive structure. Also, responsiveness to the inertia forces regardless of direction can be made as sensitive as desired.

What is claimed is:

1. In a seat belt retractor; the combination of a frame having reel rotatably supported thereon; a belt wound on the reel; reel bias means urging the reel to a belt retracted position; latching means locking the reel in a selected belt extended position; the latching means having a latched position for resisting rotation of the reel in a belt extended direction beyond the selected belt extended position and an unlatched position permitting unimpeded rotation of the reel in the belt extended direction; bias means urging the latching means to the latched position; and holding means responsive to inertia forces on the retractor for releasably holding the latching means in the unlatched position; the holding means including locking means operative in the locked position thereof to hold the latching means in the unlatched position and in the unlocked position thereof to release the latching means for movement to the latched position, the locking means having biasing means urging the locking means to the unlocked position, magnet means responsive to inertia forces acting on the retractor and having a set position and an unset position, the magnet means being arranged in the set position thereof to maintain the locking means in the locked position, the magnet means also being arranged to be moved to the unset position by the inertia forces acting thereon when in excess of a predetermined magnitude so as to permit the locking means to be returned by the biasing means to the unlocked position, and reset means operated by the belt when moved to the retracted position thereof, the reset means being operative when operated by the belt to return the locking means to the locked position and the magnet means to the set position.

2. A seat belt retractor as described in claim 1, wherein the magnet means includes a permanent magnet.

3. A seat belt retractor as described in claim 1, wherein the holding means includes housing means mounted on the latching means and the locking means includes a plunger slidable within the housing means, the plunger having a locking rod portion arranged to engage the frame in the locked position of the locking means so as to releasably hold the latching means in the unlatched position, the biasing means being positioned within the housing means so as to urge the plunger to the unlocked position of the locking means.

4. A seat belt retractor as discussed in claim 3, wherein the reset means includes a pivotal reset lever having a plunger engaging portion extending into the housing means and a belt engaging portion extending externally of the housing means and in the path of the retracted belt so that the belt pivots the reset lever and causes the plunger engaging portion to urge the plunger from the unlocked position to the locked position of the locking means.

5. A seat belt retractor as described in claim 4, wherein the plunger includes a reset portion for pivotally supporting the reset lever and also for moving the magnet means to the set position.

6. A seat belt retractor as described in claim 3, wherein the magnet means includes a magnet positioned within the housing means and the housing means includes a metallic element formed of a magnetic material positioned between the locking means and the magnet means and the plunger includes a reset portion formed of a magnetic material and arranged in the unlocked position of the locking means to extend through the metallic element and into the magnetic field of the magnet so that when the plunger is moved to the locked position of the locking means the magnet is moved to the set position in close proximity to the metallic element thereby developing a magnetic force therebetween for overcoming the biasing means and maintain the plunger in the locked position of the locking means.

7. A seat belt retractor as described in claim 6, wherein the magnet is formed of a permanent magnetic material, the magnet having an elongated body provided with a tapered portion at one end and a centering element formed of a non-magnetic material joined to the other end of the permanent magnet and proximate the metallic element, the tapered portion facilitating movement of the magnet to the unset position when the inertia forces acting thereon in any direction exceed the force maintaining the plunger in the locked position of the locking means.

8. A seat belt retractor as described in claim 7, wherein the reset means includes a reset lever pivotally supported by the reset portion of the plunger, the reset lever having a plunger engaging portion and a belt engaging portion extending externally of the housing means and in the path of the retracted belt so that the belt pivots the reset lever and causes the plunger engaging portion to urge the plunger from the unlocked position to the locked position of the locking means.

9. A seat belt retractor as described in claim 1, wherein the locking means includes a locking means housing formed of a nonmagnetic material and having at one end a metallic ring like element formed of a magnetic material, a plunger slidable within the housing and including a locking rod portion on one end thereof arranged to extend from the other end of the housing and engage the frame in the locked position of the locking means so as to releasably hold the latching means in the unlatched position and a reset portion on the other end thereof formed of a magnetic material and arranged in the unlocked position of the locking means to extend through the metallic ring like element, the biasing means being positioned within the housing and arranged to urge the plunger to the unlocked position of the locking means; the magnet means includes a magnet means housing formed of a nonmagnetic material, the magnet means housing being secured to the latching means and having the locking means housing secured to one end thereof, the magnet means further including a permanent magnet positioned within the magnet means housing and being of a elongated shape having a centering ring positioned thereon at one end and having a tapered portion at the other end to facilitate the movement of the permanent magnet to the unset position of the magnet means; the plunger in the unlocked position of the locking means having the reset portion thereof within the magnetic field of the permanent magnet so as to move the permanent magnet, when the plunger is moved to the locked position of the locking means, to the set position of the magnet means and into engagement with the metallic ring like element so as to develop a magnetic force for overcoming the bias of the biasing means and through the reset portion maintained the plunger in the locked position of the locking means until inertia forces in any direction overcome the differential between the magnetic force and the bias force from the plunger bias means so as to move the permanent magnet to the unset position of the magnet means and allow the plunger to return to the unlocked position of the locking means thereby releasing the latching means for return to the latched position; the reset means includes a reset lever pirotally supported by the reset portion, the reset lever having a plunger engaging portion and a belt engaging portion extending externally of the locking means housing and in the path of the retracted belt so that the belt pivots the reset lever and causes the plunger engaging portion to urge the plunger from the unlocked position of the locking means to the locked position of the locking means and correspondingly the permanent magnet from the unset position of the magnet means to the set position of the magnet means.

10. In a holding mechanism for an apparatus, such as a seat belt retractor, the combination of housing means; locking means positioned at one end of the housing means; the locking means having a locked position in which the apparatus is restrained from movement and an unlocked position in which the apparatus is released, the locking means including biasing means urging the locking means to the unlocked position; magnet means positioned in the other end of the housing means, the magnet means being responsive to inertia forces acting on the mechanism and having set and unset positions, the magnet means being arranged in the set position thereof to maintain the locking means in the locked position, the magnet means also being arranged to be moved to the unset position by the inertia forces acting thereon when in excess of a predetermined magnitude so as to permit the locking means to be urged by the biasing means to the unlocked position; and reset means for returning the locking means to the locked position and the magnet means to the set position.

11. A holding mechanism described in claim 10, wherein the locking means includes a plunger slidable within the housing means, the biasing means urging the plunger to the unlocked position of the locking means, the plunger having a locking rod portion arranged to engage the apparatus in the locked position of the locking means and a reset portion formed of a magnetic material and arranged in the unlocked position of the locking means to extend within the magnetic field of the magnet means so that when the plunger is moved to the locked position of the locking means by the reset means the magnet means is moved to the set position.

12. A holding mechanism means as described in claim 10, wherein the housing means includes a metallic ring like element formed of a magnetic material positioned between the locking means and the magnet means and the locking means includes a plunger slidable within the housing means, the biasing means urging the plunger to the unlocked position of the locking means, the plunger having a reset portion formed of a magnetic material and arranged in the unlocked position of the locking means to extend through the metallic ring like element and into the magnetic field of the magnet means and the magnet means includes a permanent magnet positioned, in the unset position of the magnet means, proximate to the reset portion of the plunger so that when the plunger is moved to the locked position of the locking means the magnetic attraction between the reset portion and the permanent magnet moves the permanent magnet in close proximity to the metallic ring like element thereby developing a predetermined magnetic force for holding the plunger in the locked position of the locking means until inertia forces acting in any direction on the holding mechanism exceed the predetermined magnetic holding force whereupon the permanent magnet returns to the unset position of the magnet means and the plunger is biased by the biasing means back to the unlocked position of the locking means.

13. A holding mechanism as described in claim 12, wherein the reset means includes a reset lever pivotally supported by the reset portion of the plunger, the reset lever having a plunger engaging portion and an actuated portion extending externally of the housing means, the reset lever being actuatable to cause the plunger engaging portion thereof to urge the plunger from the unlocked position to the locked position of the locking means and also the permanent magnet from the unset position to the set position of the magnet means.

14. A holding mechanism means as described in claim 10, wherein the locking means includes a locking means housing having a metallic ring like element formed of a magnetic material at one end thereof, a plunger slidable within the locking housing and having a locking portion on one end thereof arranged to extend beyond and through the other end of the locking housing and into engagement with the apparatus in the locked position of the locking means and a reset portion on the other end thereof arranged in the unlocked position of the locking means to extend through the metallic ring like element and into the magnetic field of the magnet means the biasing means urging the plunger to the unlocked position of the locking means; the magnet means including a magnet means housing formed of a nonmagnetic material and having an oepn end with the locking housing extending therein and a closed end, a permanent magnet positioned within the magnet means housing; the permanent magnet having a centering ring formed of a nonmagnetic material joined to the end of the permanent magnet proximate the metallic element and a tapered body portion at the opposite end to facilitate movement of the permanent magnet to the unset position of the magnet means when the inertia forces acting thereon in any direction exceed a certain magnitude; the reset means includes a reset lever pivotally supported to locking means housing by the reset portion, the reset lever having a plunger engaging portion and an actuated portion extending externally of the locking means housing, the reset lever being actuatable to cause the plunger engaging portion thereof to urge the plunger from the unlocked position to the locked position of the locking means and also the permanent magnet from the unset position to the set position of the magnet means.

* * * * *

UNITED STATES PATENT OFFICE
CERTIFICATE OF CORRECTION

Patent No. 3,790,098　　　　　　　　　Dated February 5, 1974

Inventor(s) Gerald F. Lewis

It is certified that error appears in the above-identified patent and that said Letters Patent are hereby corrected as shown below:

Column 1, line 20 after "such" delete "as" and insert --a--.

Column 3, line 12 after "the" (first occurrence) delete "ike" and insert --like--.

Column 4, line 36 delete "magnetic" and insert --magnet--.

Column 5, line 43 after "operated" delete "bythe" and insert --by the--.

Column 7, line 17 after "lever" delete "pirotally" and insert --pivotally--.

Column 8, line 47 after "an" delete "oepn" and insert --open--.

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents